(12) United States Patent
Spykerman et al.

(10) Patent No.: US 6,860,762 B2
(45) Date of Patent: Mar. 1, 2005

(54) ELECTRICAL CABLE AND CONNECTOR ASSEMBLY WITH VOLTAGE STEP DOWN SYSTEM

(75) Inventors: Conway F. Spykerman, Singapore (SG); Steve Y. Wong, El Monte, CA (US); Douglas L. Wagner, Newbury Park, CA (US)

(73) Assignee: FCI Americas Technology, Inc., Reno, NV (US)

( * ) Notice: Subject to any disclaimer, the term of this patent is extended or adjusted under 35 U.S.C. 154(b) by 56 days.

(21) Appl. No.: 10/459,313

(22) Filed: Jun. 10, 2003

(65) Prior Publication Data

US 2004/0253873 A1 Dec. 16, 2004

(51) Int. Cl.[7] .................................................. H01R 13/66
(52) U.S. Cl. ........................ 439/620; 363/142; 439/218; 439/487; 439/924.1
(58) Field of Search .................................. 439/620, 218, 439/221, 502, 956, 924.1, 487; 361/683; 363/142, 146

(56) References Cited

U.S. PATENT DOCUMENTS

| | | | | |
|---|---|---|---|---|
| 5,578,876 A | * | 11/1996 | Crampton | 307/80 |
| 5,852,544 A | * | 12/1998 | Lee | 361/683 |
| 5,865,651 A | * | 2/1999 | Dague et al. | 439/680 |
| 6,225,708 B1 | * | 5/2001 | Furukawa et al. | 307/66 |
| 6,314,001 B1 | * | 11/2001 | Chu | 361/826 |
| 6,700,808 B2 | * | 3/2004 | MacDonald et al. | 363/142 |
| 6,719,591 B1 | * | 4/2004 | Chang | 439/638 |
| 6,758,685 B1 | * | 7/2004 | Huang et al. | 439/79 |

* cited by examiner

*Primary Examiner*—Neil Abrams
(74) *Attorney, Agent, or Firm*—Harrington & Smith, LLP

(57) ABSTRACT

An electrical cable and connector assembly having an electrical cable comprising a 12 Volt supply conductor and a 5 Volt supply conductor; and an electrical connector connected to the electrical cable. The electrical connector includes a 12 Volt supply contact connected to the 12 Volt supply conductor, a 5 Volt supply contact connected to the 5 Volt supply conductor, and a 3.3 Volt supply contact connected to the 5 Volt supply conductor by a voltage step down system located inside a housing of the electrical connector. With this embodiment, the connector can be connected to a device, such as a disc drive, requiring 12 and 5 Volt inputs or alternatively can be connected to a device requiring 12 and 3.3 Volt inputs.

18 Claims, 4 Drawing Sheets

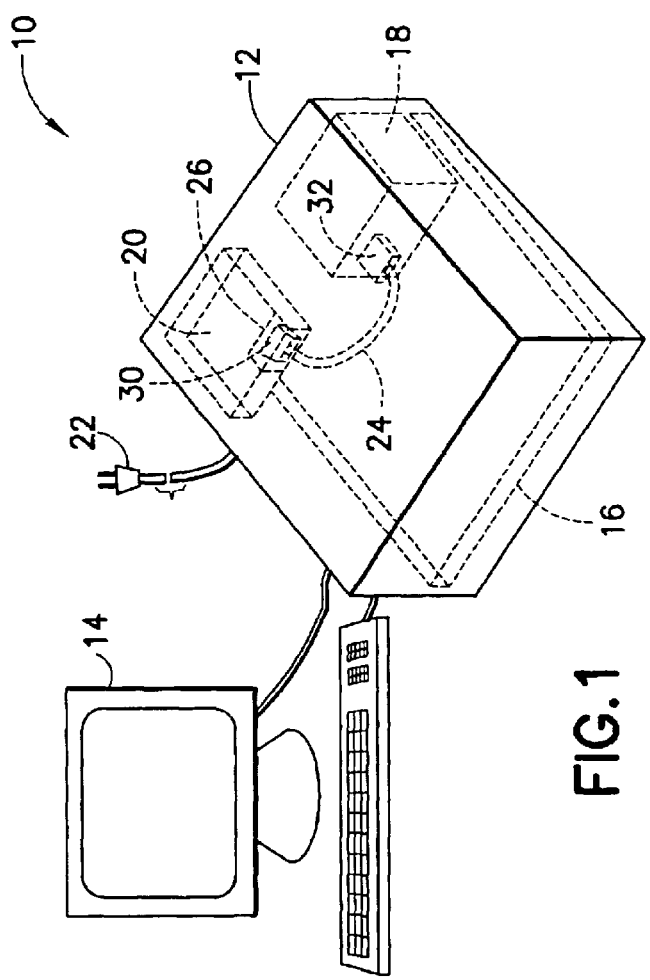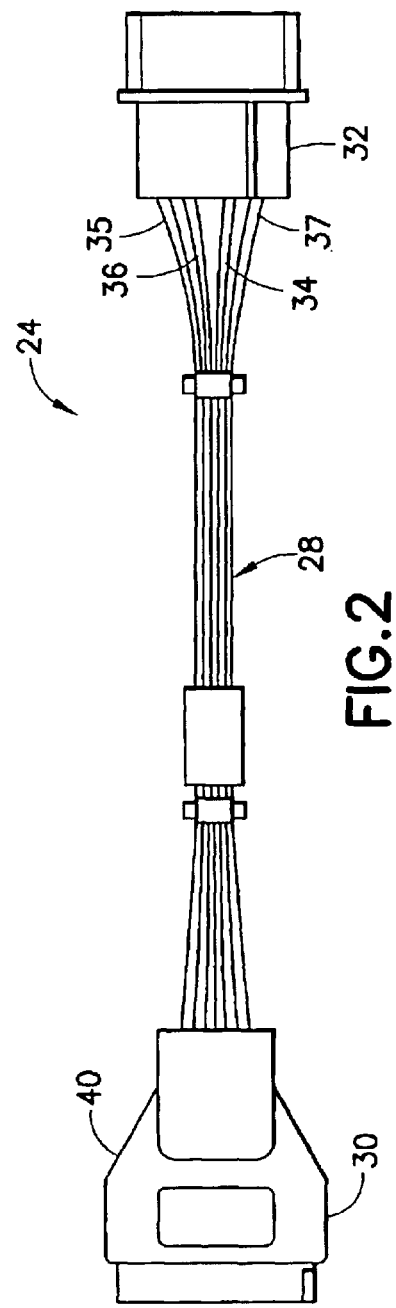

ELECTRICAL CABLE AND CONNECTOR ASSEMBLY WITH VOLTAGE STEP DOWN SYSTEM

BACKGROUND OF THE INVENTION

1. Field of the Invention

The present invention relates to electrical connectors and, more particularly, to an electrical connector having a voltage step down system.

2. Brief Description of Prior Developments

In the past, computer disk drives have been manufactured which require 12 Volt and 5 Volt power supplies. Newer computer disk drives are being proposed which require 12 Volt and 3.3 Volt power supplies. It is preferred not to redesign other components of the computer merely to accommodate the lower voltage required by the newer proposed lower voltage disk drives. Thus, a power conversion is required to reduce the 5 Volt power supply to a 3.3 Volt power supply.

One suggested solution to the required power voltage step down has been to place a power converter on the printed circuit board of the disk drive. However, a power converter can generate heat. Producing additional heat inside a disk drive is not desired because of potential detrimental effects of the heat. Thus, there is a desire to provide a 3.3 Volt power supply to a computer disk drive which does not require reconfiguration or redesign of the other major components of the computer, but which does not produce additional heat inside the disk drive.

SUMMARY OF THE INVENTION

In accordance with one aspect of the present invention, an electrical cable and connector assembly is provided having an electrical cable comprising a 12 Volt supply conductor and a 5 Volt supply conductor; and an electrical connector connected to the electrical cable. The electrical connector includes a 12 Volt supply contact connected to the 12 Volt supply conductor, a 5 Volt supply contact connected to the 5 Volt supply conductor, and a 3.3 Volt supply contact connected to the 5 Volt supply conductor by a voltage step down system located inside a housing of the electrical connector.

In accordance with another aspect of the present invention, an electrical cable and connector assembly is provided comprising an electrical cable comprising two different voltage supply conductors for conducting a first voltage and a second different voltage, respectively; and an electrical connector connected to an end of the electrical cable. The electrical connector has at least three groups of different voltage electrical contacts coupled to the two different voltage supply conductors. The electrical connector comprises means for supplying the second voltage from a second one of the voltage supply conductors to a second one of the groups of contacts and for stepping down voltage from the second voltage supply conductor to a third one of the groups of contacts. The electrical connector is sized and shaped to be connected to a first mating electrical connector to connect a first one of the groups of contacts, which is connected to a first one of the voltage supply conductors, and the second group of contacts to the first mating electrical connector to supply the first voltage and the second voltage, but not supply the third voltage to the first mating electrical connector. The electrical connector is sized and shaped to be alternatively connected to a second different mating electrical connector to connect the first group of contacts and a third one of the groups of contacts to contacts of the second mating electrical connector and supply the first voltage and the third voltage to the second mating electrical connector.

In accordance with one method of the present invention, a method of manufacturing an electrical cable and electrical connector assembly is provided comprising steps of providing an electrical cable having a first voltage supply conductor and a second voltage supply conductor, the first conductor being adapted to conduct a higher voltage current than the second conductor; connecting a voltage step down circuit to the second conductor at an end of the electrical cable; and connecting electrical contacts to the voltage supply conductors and the voltage step down circuit, the electrical contacts comprising a first voltage supply contact coupled to the first conductor, a second voltage supply contact coupled to the second conductor, and a third voltage supply contact coupled to the second conductor by the voltage step down circuit such that the three voltage supply contacts can supply three different voltages from the two voltage supply conductors of the electrical cable.

BRIEF DESCRIPTION OF THE DRAWINGS

The foregoing aspects and other features of the present invention are explained in the following description, taken in connection with the accompanying drawings, wherein:

FIG. 1 is a diagrammatic perspective view of a computer having an electrical cable and electrical connector assembly incorporating features of the present invention;

FIG. 2 is a tip plan view of the electrical cable and connector assembly shown in FIG. 1;

DETAILED DESCRIPTION OF THE PREFERRED EMBODIMENT

Figure 3:
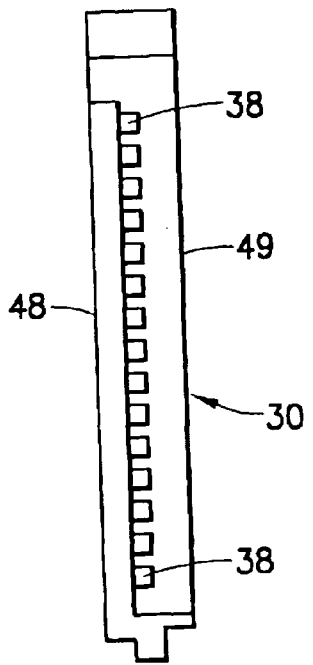
FIG. 3 is an end view of the first electrical connector of the assembly shown in FIG. 2.

Referring to FIG. 1, there is shown a perspective view of a computer system 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The computer system 10 generally comprises a main unit 12 and a display 14. In the embodiment shown, the computer system 10 is a desktop type of PC. However, in alternate embodiments, features of the present invention could be used in any suitable type of computer system, such as a notebook computer. Features of the present invention could also be used in any suitable type of electronic component which uses a disk drive.

The main unit 12 generally comprises a mother printed circuit board 16, a power supply 18, and a disk drive 20. The power supply 18 is adapted to be connected to an electrical supply by the plug and cord 22. However, in an alternate embodiment, the power supply 18 might comprise a rechargeable battery, such as in a laptop computer. The disk drive 20 is connected to the power supply 18 by an electrical cable and electrical connector assembly 24. The disk drive 20 includes an electrical connector 26.

Referring also to FIGS. 2–5, the electrical cable and electrical connector assembly 24 generally comprises an electrical cable 28, a first electrical connector 30, and a second electrical connector 32. The second electrical connector 32 is removably attached to the power supply 18. The first electrical connector 30 is removably attached to the mating electrical connector 26 of the disk drive 20. The electrical cable 28 generally comprises two different voltage supply conductors 34, 36, and two ground conductors 35, 37. The first voltage supply conductor 34 is adapted to supply a 12 Volt current from the power supply 18. The second voltage supply conductor 36 is adapted to supply a 5 Volt current from the power supply 18.

Figure 4:
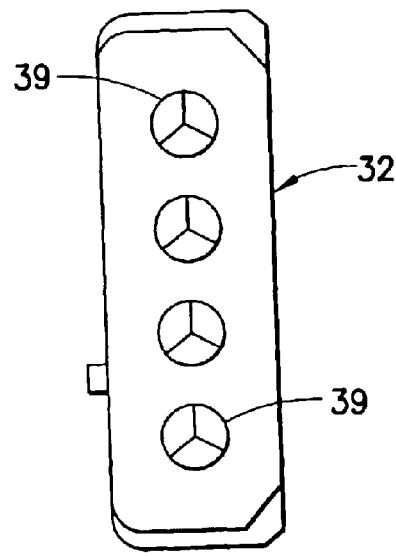
FIG. 4 is an end view of the second electrical connector of the assembly shown in FIG. 2.
Figure 5:
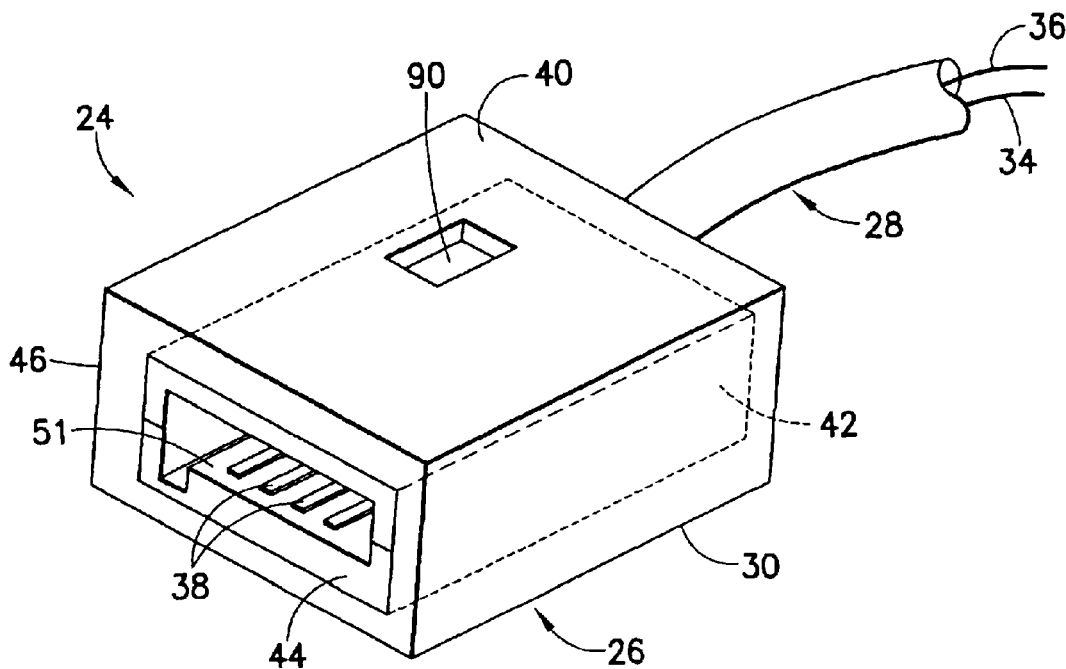
FIG. 5 is a perspective view of an end of the electrical cable and electrical connector assembly shown in FIG. 1.

The conductors of the cable 28 are coupled to contacts 38 of the first electrical connector 30 and contacts 39 of the second electrical connector 32. As seen in FIG. 4, the second electrical connector comprises four of the electrical contacts 39; one contact 39 for each of the conductors 34–37. Thus, one of the contacts 39 is a 5 Volt contact, one of the contacts 39 is a 12 Volt contact, and the other two contacts are ground contacts.

The electrical cable and electrical connector assembly 24 can be used to supply a 12 Volt current and a 3.3 Volt current to the proposed new 12V/3.3V disk drive by stepping down or converting the 5 Volt current from conductor 36 into 3.3 Volts in the first electrical connector 30. This can be done in the connector 30 rather than in the disk drive or elsewhere. This helps to allow heat generated from the power conversion to remain outside of the disk drive. By integrating the power conversion into the connector 30 rather than elsewhere, the footprint of the computer does not need to be increased. The other components of the computer also do not need to be redesigned. The assembly 24 merely needs to be provided rather than the old conventional 12V/5V cable and connector assembly. The assembly 24 can also be used with a conventional 12V/5V disk drive.

Thus, the assembly 24 provides a 12V/5V/3.3V cable and connector assembly.

Figure 6:
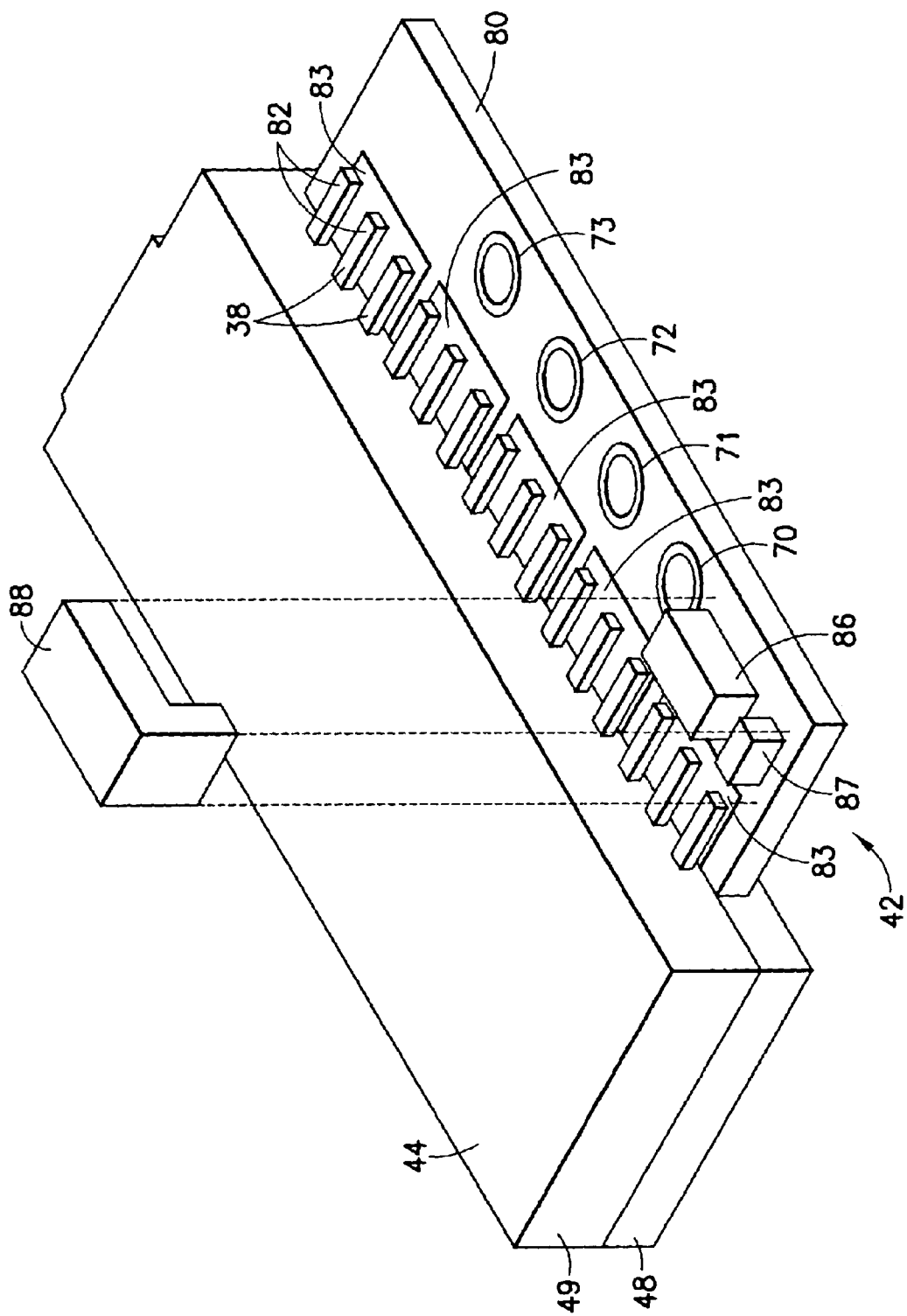
FIG. 6 is a perspective view of components of the electrical connector of the assembly shown in FIG. 5.

Referring particularly to FIG. 6, the first electrical connector 30 generally comprises the contacts 38, a housing 40 (see FIG. 2), and a voltage step down system 42. As shown best in FIG. 5, the housing 40 generally comprises an inner housing 44 and an outer housing 46. The outer housing 46 is preferably overmolded onto the inner housing 44. However, in an alternate embodiment, the outer housing 46 might comprise multiple housing members which are snap-lock connected to each other, or otherwise connected to each other. The inner housing 44 comprises a base member 48. The contacts 38 are mounted to the base member 48. The base member 48 and a top member 49 form the inner housing 44. The base member 48 and the top member 49 form a receiving area 51 (see FIG. 5) at the front of the inner housing 44 for receiving a mating portion of the connector 26.

Figure 7:
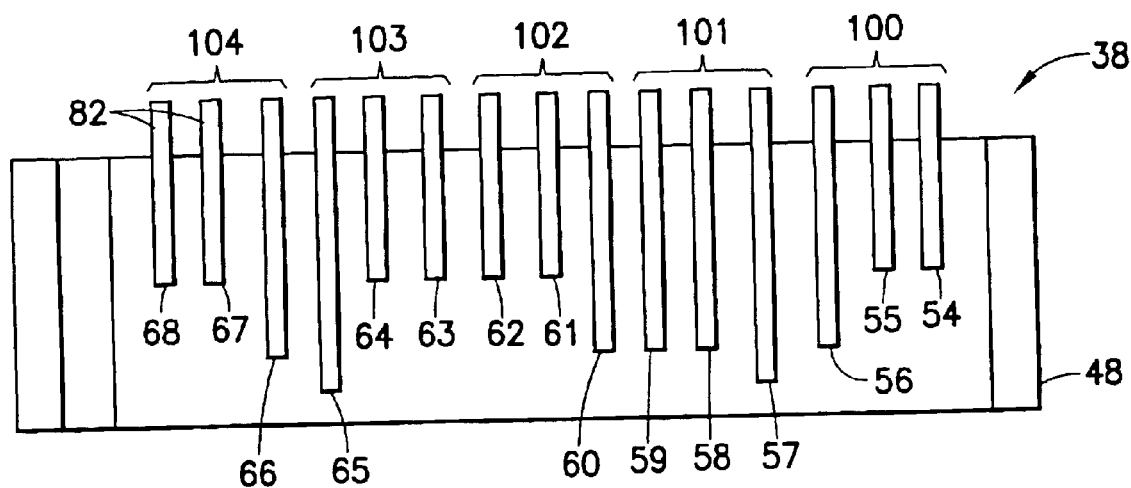
FIG. 7 is a top plan view of a bottom housing piece of the connector shown in FIG. 6 and showing a layout of the electrical contacts of the electrical connector.

Referring also to FIG. 7, in this embodiment the first electrical connector 30 comprises fifteen of the electrical contacts 38. The electrical contacts 38 are arranged in five groups 100, 101, 102, 103, 104. The first group 100 of contacts is, adapted for a 3.3 Volt current supply. The second group 101 of contacts is adapted for ground. The third group 102 of contacts is adapted for a 5 Volt current supply. The fourth group 103 of contacts is adapted for ground. The fifth group 104 of contacts is adapted for a 12 Volt current supply.

The contacts 38 have the following layout and function:

| Sequence | Drawing Reference No. | Description |
| --- | --- | --- |
| P1 | 54 | 3.3 V power |
| P2 | 55 | 3.3 V power |
| P3 | 56 | 3.3 V power, pre-charge, $2^{nd}$ mate |
| P4 | 57 | Ground, $1^{st}$ mate |
| P5 | 58 | Ground |
| P6 | 59 | Ground |
| P7 | 60 | 5 V power, pre-charge, $2^{nd}$ mate |
| P8 | 61 | 5 V power |
| P9 | 62 | 5 V power |
| P10 | 63 | Ground |
| P11 | 64 | Reserved: 1. The pin corresponding to P11 in the backplane receptacle connector is also reserved 2. The corresponding pin to be mated with P11 in the power cable receptacle connector shall always be grounded |
| P12 | 65 | Ground, $1^{st}$ mate |
| P13 | 66 | 12 V power, pre-charge, $2^{nd}$ mate |
| P14 | 67 | 12 V power |
| P15 | 68 | 12 V power |

The contacts 38 are preferably electrical contact pins or deflectable spring contacts aligned in a row with a pitch or spacing therebetween, such as a pitch of about 1.27 mm for example. The comments on the mating sequence in the Table above apply to the case of a backplane blindmate connector only. In this case, the mating sequences are:

(1) the ground pins $P_4$ and $P_{12}$; (2) the pre-charge power pins and the other ground pins; and (3) the rest of the power pins.

As shown in FIG. 6, the voltage step down system 42 generally comprises a printed circuit board 80 and circuitry located on the printed circuit board. The contacts 38 include rear end tails 82 which are attached to the printed circuit board 80. The rear end tails 82 can be attached to contact pads on the printed circuit board 80, such as by soldering. There are five of the contact pads 83; one pad 83 for each one of the groups 100–104 of contacts. The printed circuit board 80 also comprises four contact areas 70, 71, 72, 73 which are adapted to have the conductors 34–37 of the cable 28 respectively attached thereto. The contact areas 70–73 comprise through-holes. The conductors 34–37 can be located in the through-holes and soldered thereto. The printed circuit board 80 functions as a coupling between the conductors 34–37 of the cable 28 and the contacts 38. However, some of the conductors of the cable 28 could be directly connected to the contacts 38.

The printed circuit board 80 includes conductive traces between the contact areas 70–73 and the contact pads 83. The printed circuit board 80 also comprises circuitry which forms a voltage step down circuit. In this embodiment, the voltage step down circuit comprises a voltage regulator 86 and a resistor 87. An input into the voltage regulator 86 is connected to the contact area 71 which is connected to the 5 Volt electrical conductor 36 of the cable 28. An output from the voltage regulator 86 is connected to the contact pad 83 which is connected to the 3.3 Volt contacts 54, 55, 56. The contact area 71, which is connected to the 5 Volt electrical conductor 36 of the cable 28, is also connected to the 5 Volt contacts 60, 61, 62. Contact area 73 is coupled to the 12 Volt conductor 34 and the contacts 66, 67, 68. Contact area 72 is coupled to one of the ground conductors 35 or 37 and the contacts 63, 64, 65. Contact area 70 is coupled to the other ground conductor 35 or 37 and the contacts 57, 58, 59.

With this type of embodiment, the third group 102 of contacts can supply a 5 Volt current. The first group 100 of contacts can supply a 3.3 Volt current with the aid of the voltage regulator 86 and resistor 87; the voltage being stepped down from the input voltage of 5 Volts. With the present invention, the electrical connector 30 can be alternatively connected to either a first mating electrical connector 26 for a first type of disk drive 20 which requires a 12 Volt input and a 5 Volt input, or can be connected to a second different mating electrical connector for a second type of disk drive which requires a 12 Volt input and a 3.3 Volt input. Thus, the electrical cable and connector assembly 24 can be used with a conventional disk drive which needs a 5 Volt input, and also can be used with a proposed newer disk drive which needs a 3.3 Volt input rather than a 5 Volt input.

In the embodiment shown in FIG. 6, the voltage step down system 42 can also comprises a heat sink 88 (shown in an exploded view in FIG. 6 relative to the PCB 80). The heat sink 88 is fixedly attached to the printed circuit board 80 and is in thermal contact with the voltage regulator 86. The heat sink 88 can help to remove heat generated from the voltage regulator 86 from the voltage conversion. In a preferred embodiment, the housing 40 comprises at least one aperture 90 (see FIG. 5) to allow heat from the heat sink 88 to exit the housing.

In alternate embodiments, the electrical connector could comprise more or less than fifteen of the electrical contacts 38. The contacts 38 could also be arranged in any suitable type of configuration. One or more of the contacts 38, such as the ground contacts, could be combined into a single contact. Any suitable type of configuration could be provided for the contacts 38 including stationary contact pads. In alternate embodiments, any suitable type of system could also be used to attach the conductors of the cable 28 to the printed circuit board 80. In an alternate embodiment, the cable and connector assembly might merely be a 12V/3.3V cable and connector assembly, such as when the connector 30 does not have contacts for the 5 Volt current. The cable 28 could have more or less than four conductors. There could also be more or less than five of the pads 83. In one type of alternate embodiment, features of the present invention could be integrated in an electrical connector which also comprised signal contacts, and an assembly with a cable having signal conductors.

Figure 8:
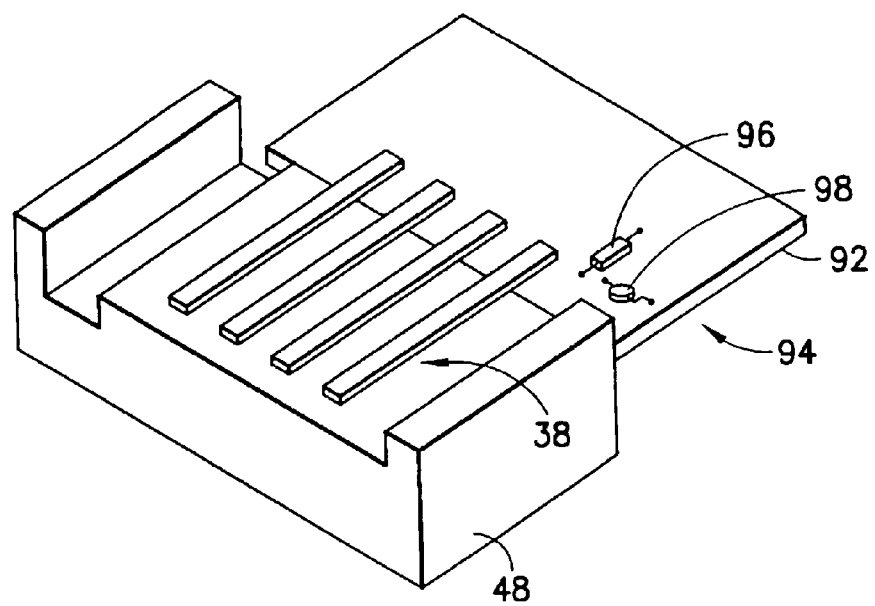
FIG. 8 is a partial perspective view of components of an alternate embodiment of the first electrical connector of the assembly shown in FIG. 2.

Referring now also to FIG. 8, components for an alternate embodiment of the present invention is shown. The electrical connector for this alternate embodiment would comprise the base member 48 and contacts 38, but the printed circuit board 92 is different. In this embodiment, the voltage step down system 94 generally comprises the printed circuit board 92, a resistor 96, and a Zener diode 98. A Zener diode is a diode that allows current to flow through it in either direction. The reason a Zener diode is still considered a diode, rather than a resistor, is that it is much easier to get current to flow in the "forward" direction than in the "reverse" direction. In order for a Zener diode to enter reverse breakdown mode, a sufficient voltage must be applied. The voltage needed varies between diodes, but it is easy to manufacture a diode with a very specific voltage. For this reason, most Zener diodes are used in reverse breakdown mode because it allows the designer of a circuit to closely control voltages. By use of a Zener diode rather than a voltage regulator, the cost of the printed circuit board 92 would be less expensive than the cost of the printed circuit board 80 having the voltage regulator.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical cable and connector assembly comprising:

an electrical cable comprising a 12 Volt supply conductor and a 5 Volt supply conductor; and an electrical connector connected to the electrical cable, the electrical connector comprising a 12 Volt supply contact connected to the 12 Volt supply conductor, a 5 Volt supply contact connected to the 5 Volt supply conductor, and a 3.3 Volt supply contact connected to the 5 Volt supply conductor by a voltage step down system located inside a housing of the electrical connector.

2. An electrical cable and connector assembly as in claim 1 wherein the voltage step down system comprises a voltage regulator adapted to step down the 5 Volt current from the 5 Volt supply conductor to 3.3 Volts.

3. An electrical cable and connector assembly as in claim 2 wherein the voltage step down system comprises a printed circuit board, wherein the voltage regulator is mounted to the printed circuit board.

4. An electrical cable and connector assembly as in claim 3 further comprising a heat sink connected to the printed circuit board and to the voltage regulator for removing heat from the voltage regulator.

5. An electrical cable and connector assembly as in claim 4 wherein the electrical connector comprises a housing with at least one aperture therethrough to allow heat to pass through the aperture from the heat sink.

6. An electrical cable and connector assembly as in claim 5 wherein the housing comprises an overmolded housing which is overmolded onto the printed circuit board.

7. An electrical cable and connector assembly as in claim 5 wherein the housing comprises snap lock connected housing members.

8. An electrical cable and connector assembly as in claim 1 wherein the voltage step down system comprises a resistor and a Zener diode.

9. An electrical cable and connector assembly as in claim 1 wherein the electrical connector comprises at least fifteen electrical contacts arranged in five groups.

10. An electrical cable and connector assembly as in claim 9 wherein the electrical connector is sized and shaped to be connected to a first mating electrical connector to connect a first group of contacts and a second group of contacts to the first mating electrical connector to supply the 12 Volt current and the 5 Volt current, but not supply the 3.3 Volt current to the first mating electrical connector, and wherein the electrical connector is sized and shaped to be alternatively connected to a second different mating electrical connector to connect the first group of contacts and a third group of contacts to contacts of the second mating electrical connector and supply the 12 Volt current and the 3.3 Volt current to the second mating electrical connector.

11. An electrical connector assembly comprising:

a housing;

at least three groups of different voltage electrical contacts adapted to be coupled to two different voltage supply conductors; and means for supplying a second voltage from a second one of the voltage supply conductors to a second one of the groups of contacts and for stepping down voltage to a third voltage from the second voltage supply conductor to a third one of the groups of contacts, wherein the electrical connector is sized and shaped to be connected to a first mating electrical connector to connect a first one of the groups of contacts, which is connected to a first one of the voltage supply conductors, and the second group of contacts to the first mating electrical connector to supply a first voltage and the second voltage, but not supply the third voltage to the first mating electrical connector, and wherein the electrical connector is sized and shaped to be alternatively connected to a second different mating electrical connector to connect the first group of contacts and a third one of the groups of contacts to contacts of the second mating electrical connector and supply the first voltage and the third voltage to the second mating electrical connector.

12. An electrical connector assembly as in claim 11 wherein the means for supplying comprises a voltage regulator adapted to step down the second voltage from a 5 Volt current to 3.3 Volt current.

13. An electrical connector assembly as in claim 12 wherein the means for supplying comprises a printed circuit board, wherein the voltage regulator is mounted to the printed circuit board.

14. An electrical connector assembly as in claim 13 further comprising a heat sink connected to the printed circuit board and to the voltage regulator for removing heat from the voltage regulator.

15. An electrical connector assembly as in claim 14 wherein the electrical connector comprises a housing with at least one aperture therethrough to allow heat to pass through the aperture from the heat sink.

16. An electrical connector assembly as in claim 11 wherein the means for supplying comprises a resistor and a Zener diode.

17. An electrical connector and cable assembly comprising:

an electrical cable comprising only two power conductors including a 12 Volt supply conductor and a 5 Volt supply conductor; and an electrical connector assembly as in claim 11 connected to the electrical cable.

18. A method of manufacturing an electrical cable and electrical connector assembly comprising steps of:

providing an electrical cable having a first voltage supply conductor and a second voltage supply conductor, the first conductor being adapted to conduct a higher voltage current than the second conductor;

connecting a voltage step down circuit to the second conductor at an end of the electrical cable; and connecting electrical contacts to the voltage supply conductors and the voltage step down circuit, the electrical contacts comprising a first voltage supply contact coupled to the first conductor, a second voltage supply contact coupled to the second conductor, and a third voltage supply contact coupled to the second conductor by the voltage step down circuit such that the three voltage supply contacts can supply three different voltages from the two voltage supply conductors of the electrical cable.

* * * * *